United States Patent
Huang

(10) Patent No.: US 7,350,825 B1
(45) Date of Patent: Apr. 1, 2008

(54) WALL-MOUNTED ELBOW DUCT

(76) Inventor: So-Mel Huang, No. 289, Peng Yi Road, Taiping City, Taichung (TW)

( * ) Notice: Subject to any disclaimer, the term of this patent is extended or adjusted under 35 U.S.C. 154(b) by 0 days.

(21) Appl. No.: 11/650,587

(22) Filed: Jan. 8, 2007

(51) Int. Cl.
*F16L 43/00* (2006.01)
*A47K 3/00* (2006.01)
*A47K 4/00* (2006.01)

(52) U.S. Cl. .............................. 285/179; 285/46; 4/570; 4/615

(58) Field of Classification Search ................ 285/179, 285/179.1, 179.2, 180, 181, 182, 183, 46; 4/570, 567, 568, 601, 615; 137/859
See application file for complete search history.

(56) References Cited

U.S. PATENT DOCUMENTS

| | | | | |
|---|---|---|---|---|
| 1,033,681 | A * | 7/1912 | Drager | 277/398 |
| 1,727,126 | A * | 9/1929 | Martin et al. | 285/281 |
| 2,900,139 | A * | 8/1959 | Hensley, Jr. | 239/499 |
| 3,791,588 | A * | 2/1974 | Buzzi | 239/446 |
| 3,826,454 | A * | 7/1974 | Zieger | 248/75 |
| 3,865,310 | A * | 2/1975 | Elkins et al. | 239/283 |
| 4,307,901 | A * | 12/1981 | Orberg et al. | 285/3 |
| 4,702,274 | A * | 10/1987 | Kramer | 137/515.5 |
| 4,933,999 | A * | 6/1990 | Mikiya et al. | 4/568 |
| 5,230,106 | A * | 7/1993 | Henkin et al. | 4/541.4 |
| 5,309,582 | A * | 5/1994 | Henkin et al. | 4/603 |
| 5,353,448 | A * | 10/1994 | Lee | 4/597 |
| 6,425,149 | B1 * | 7/2002 | Wang | 4/675 |
| 6,618,872 | B1 * | 9/2003 | Fan | 4/615 |
| 7,120,948 | B1 * | 10/2006 | Fan | 4/615 |
| 2002/0032926 | A1 * | 3/2002 | Lewis | 4/680 |
| 2005/0283903 | A1 * | 12/2005 | Sun | 4/570 |
| 2007/0067902 | A1 * | 3/2007 | Miller et al. | 4/567 |

* cited by examiner

*Primary Examiner*—James M. Hewitt
(74) *Attorney, Agent, or Firm*—Troxell Law Office, PLLC

(57) ABSTRACT

A wall-mounted elbow duct and particularly to a wall-mounted elbow duct to connect a wall-mounted water discharge pipe to a hand-held shower head mainly includes an elbow duct which houses a reverse checking mechanism and a coupler and a coupling cap. By means of the invention the hand-held shower head can be connected to the wall-mounted water discharge pipe without a great number of elements. An ornamental cover also is formed to conceal the connecting portion of the water discharge pipe to enhance aesthetic appeal.

2 Claims, 6 Drawing Sheets

WALL-MOUNTED ELBOW DUCT

BACKGROUND OF THE INVENTION

1. Field of the Invention

The present invention relates to a wall-mounted elbow duct to connect a wall-mounted water discharge pipe to a hand-held shower head that does not need a great number of coupling elements to save installation trouble and provides an ornamental cover to conceal the connecting portion of the water discharge pipe to enhance aesthetic appeal.

2. Description of the Prior Art

Refer to FIG. 1 for a conventional wall-mounted shower head structure. It sprays water only in one direction from top to down, hence is not convenient to clean user's body in some circumstances. To remedy this problem user has to remove the wall-mounted shower head 11 and install a hand-held shower head 12 instead. However, when using the conventional hand-held shower 12 users often do not properly position the hand-held shower head after finishing shower, and leave the hand-held shower head in the bathtub 13 filled with water (as shown in FIG. 2). Due to siphonage action, dirty water flows backwards to the water supply source. To prevent this phenomenon from happening, a check valve 17 has to be coupled with an elbow duct 16 of a wall-mounted water discharge pipe 14 before coupling with the hand-held shower head 12. Then a hose 15 of the hand-held shower head 12 is connected. Such an installation results in not smooth connection and has less aesthetic appeal. Moreover, a great number of coupling elements are needed. Installation is more difficult.

SUMMARY OF THE INVENTION

In view of the aforesaid problems, the present invention aims to provide a wall-mounted elbow duct that can connected a wall-mounted water discharge pipe to a shower head without a lot of coupling elements. An ornamental cover also is provided at the connecting portion to improve total aesthetic appeal.

The wall-mounted elbow duct according to the invention includes an elbow duct, a reverse checking means, a coupler and a coupling cap.

The elbow duct has one end with an external treaded portion formed thereon to be fastened to a wall-mounted water discharge pipe and other end forming a coupling seat. The coupling seat has a housing chamber to hold the reverse checking means and two opposing jutting ribs on two outer edges. The housing chamber has an internal screw hole.

The reverse checking means includes a first coupling ring, a first washer, a second washer and a second coupling ring.

The coupler has one end with a first threaded portion formed thereon corresponding to the internal screw hole of the elbow duct and other end with a second threaded portion formed thereon to fasten to a hose connector of a hand-held shower head.

The coupling cap aims to cover the wall-mounted water discharge pipe and the elbow duct, and has an ornamental surface on an outer surface to conceal the wall-mounted water discharge pipe and elbow duct, and a housing trough on an inner side to hold the elbow duct and two detention flutes corresponding to and wedged in by the jutting ribs.

By means of the construction set forth above the problems occurred to coupling of the conventional hand-held shower head can be resolved.

The foregoing, as well as additional objects, features and advantages of the invention will be more readily apparent from the following detailed description, which proceeds with reference to the accompanying drawings.

DESCRIPTION OF THE PREFERRED EMBODIMENT

Figure 1:
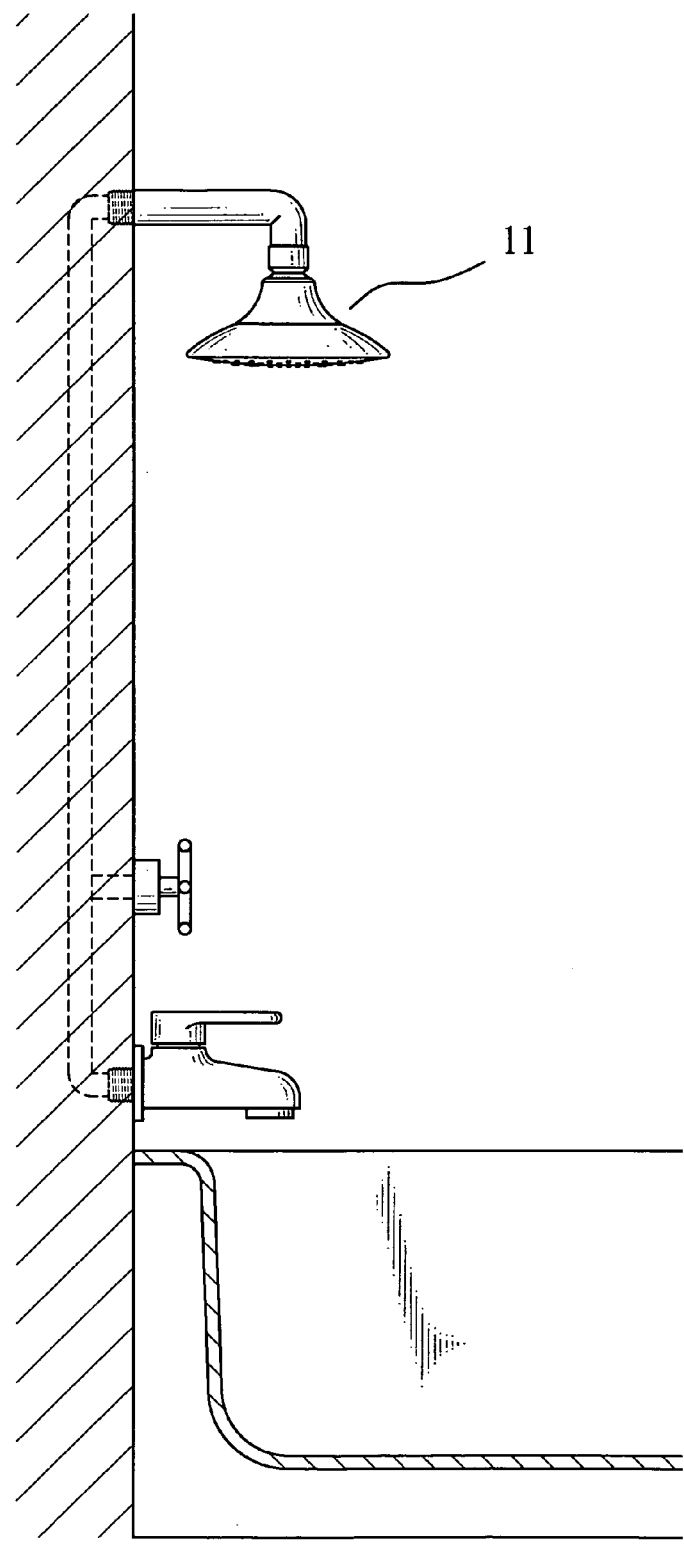
FIG. 1 is a schematic view of a conventional wall-mounted shower head in an assembly condition.
Figure 2:
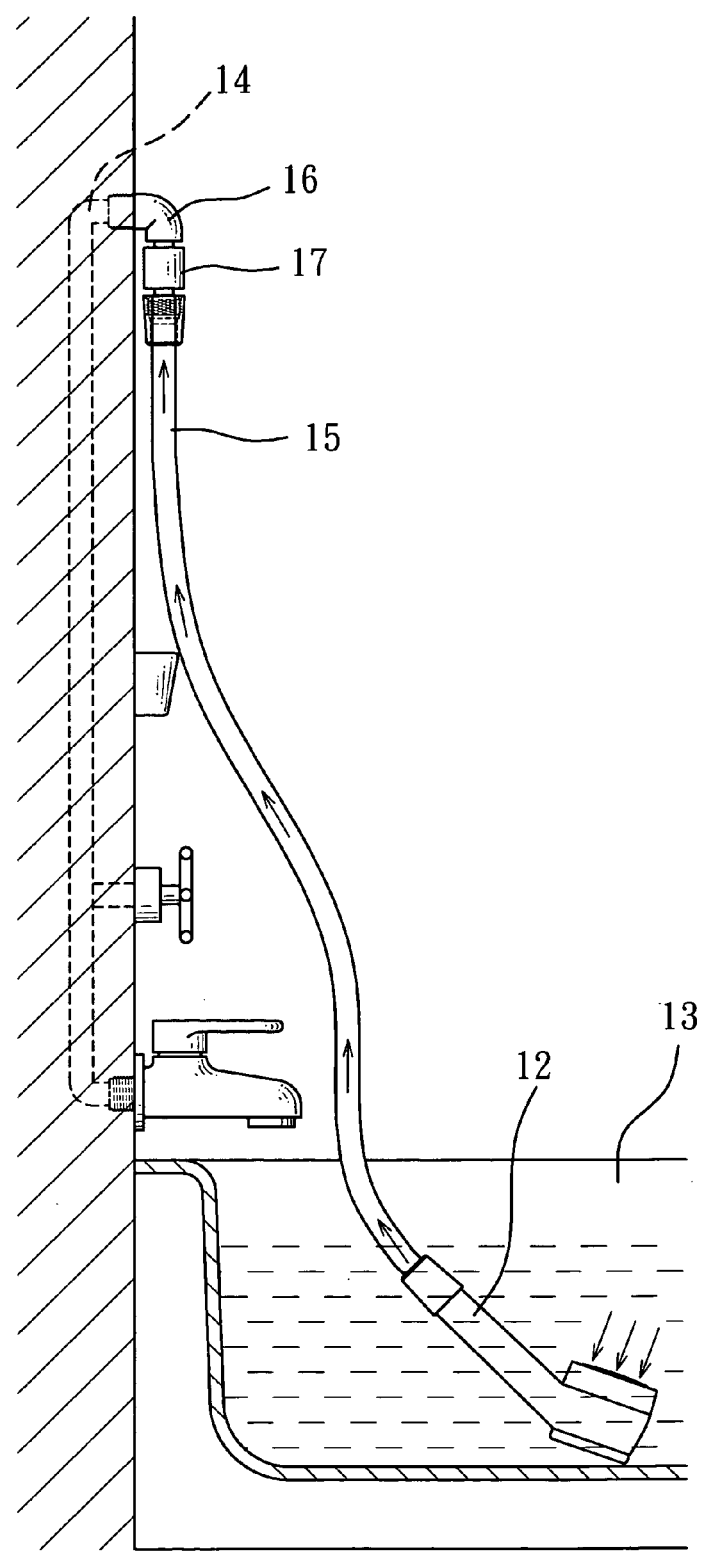
FIG. 2 is a schematic view of a conventional hand-held shower head in an assembly condition.
Figure 3:
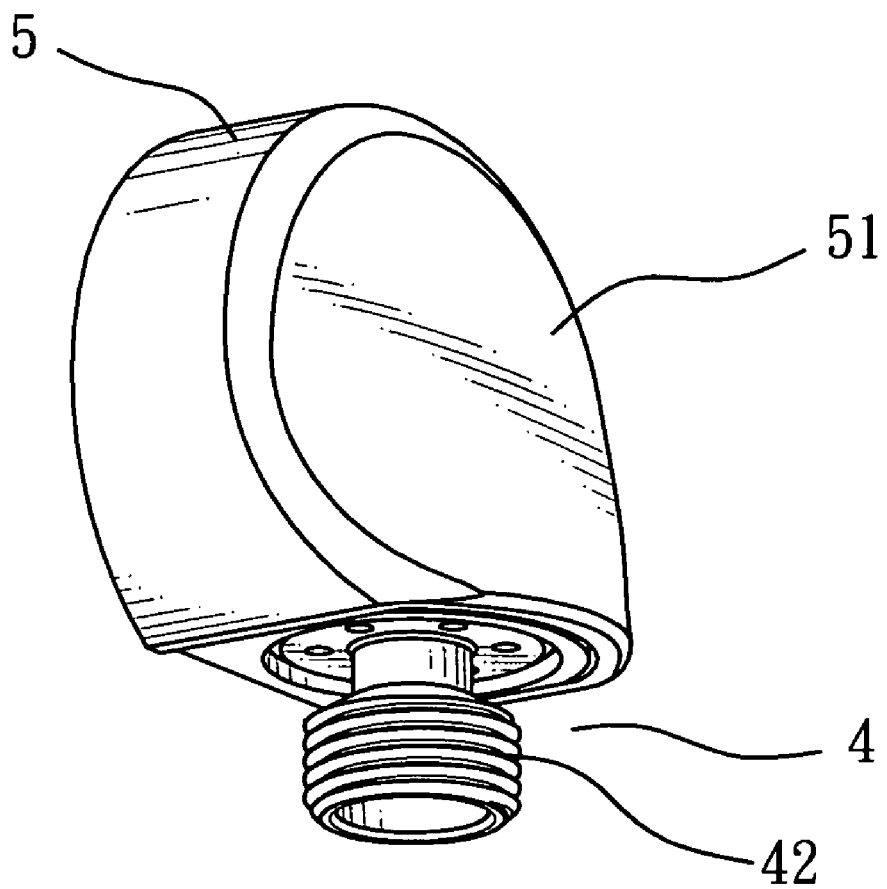
FIG. 3 is a perspective view of the invention.
Figure 4:
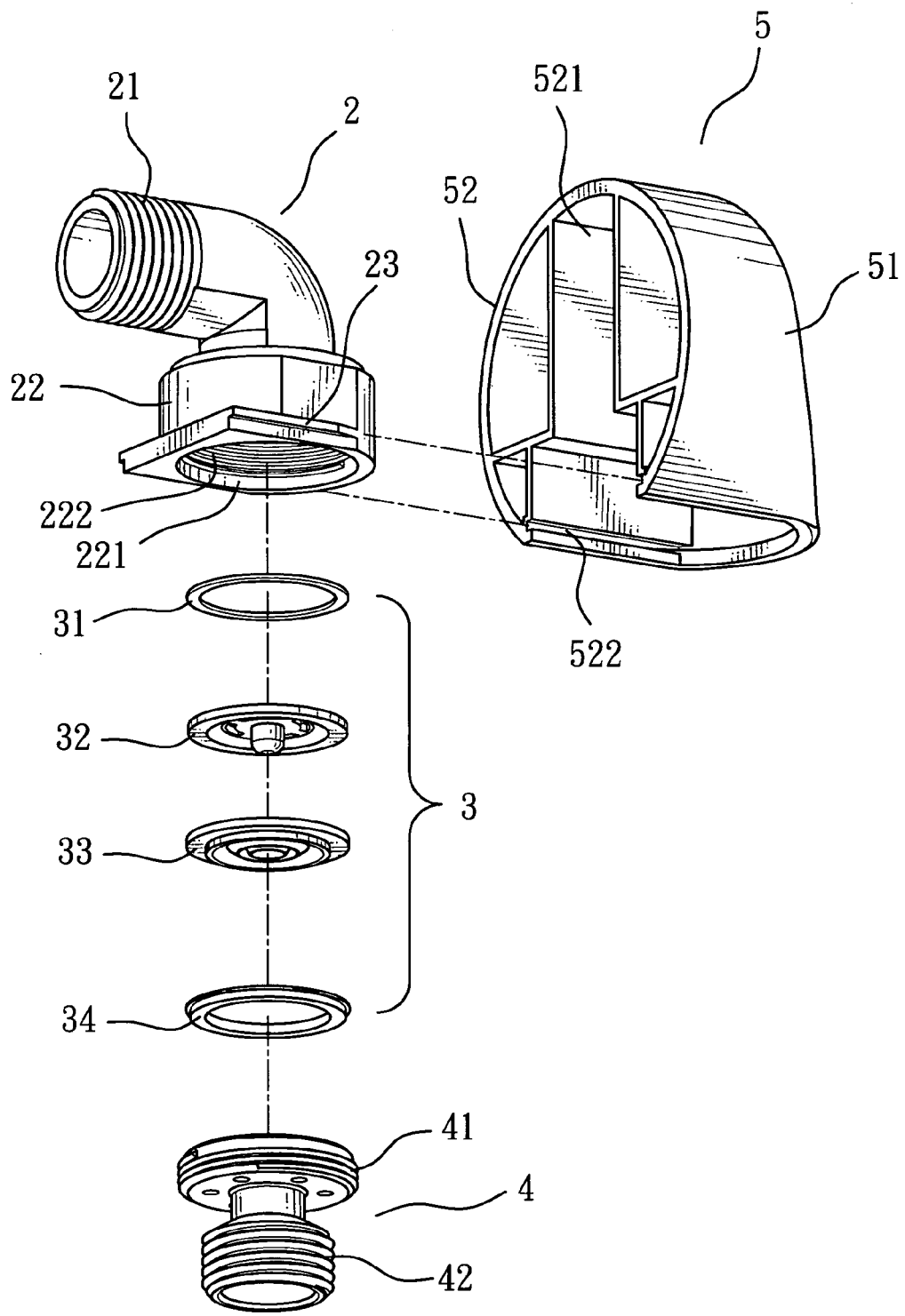
FIG. 4 is an exploded view of the invention.
Figure 5:
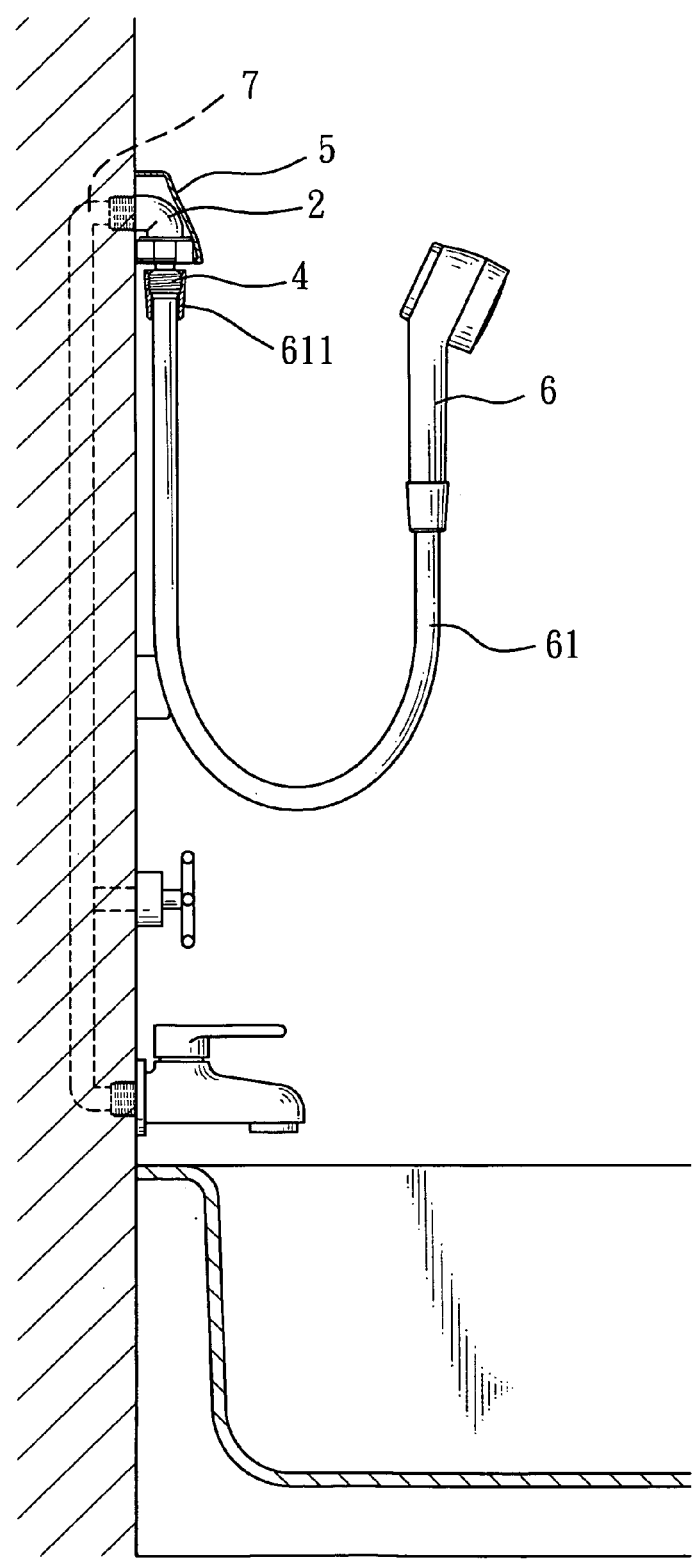
FIG. 5 is a schematic view of an embodiment of the invention in an assembly condition.
Figure 6:
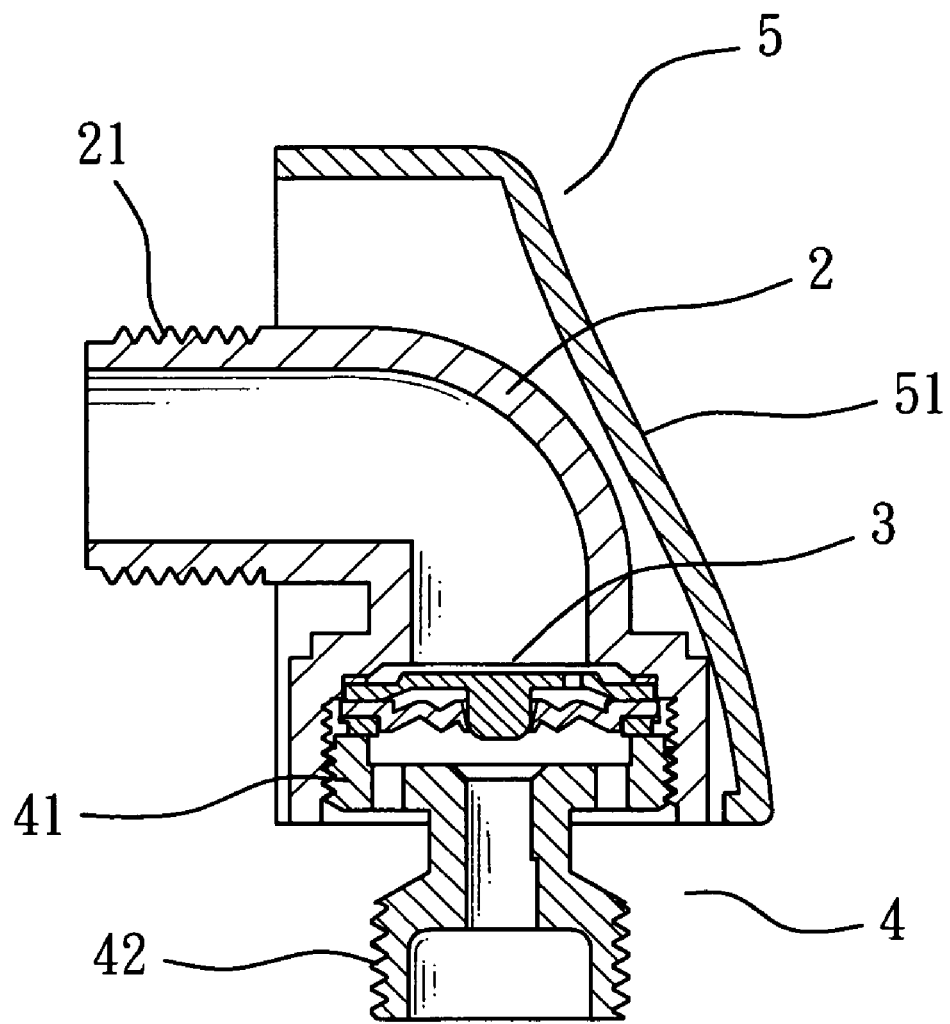
FIG. 6 is a sectional view of the invention.

Referring to FIGS. 3 through 6, the wall-mounted elbow duct according to the invention mainly includes an elbow duct 2 to house a reverse checking means 3, a coupler 4 and a coupling cap 5.

The elbow duct 2 has one end with an external threaded portion 21 formed therein and other end forming a coupling seat 22. The coupling seat 22 has a housing chamber 221 to hold the reverse checking means 3. The housing chamber 221 has an internal screw hole 222. The coupling seat 22 further has two opposing jutting ribs 23 on two outer edges.

The structure of the reverse checking means 3 is known in the art. It includes a first coupling ring 31, a first washer 32, a second washer 33 and a second coupling ring 34.

The coupler 4 has one end with a first threaded portion 41 formed thereon corresponding to the internal screw hole 222 of the elbow duct 2 and other end with a second threaded portion 42 formed thereon to be fastened to a connector 611 of a hose 61 of a hand-held shower head 6.

The coupling cap 5 aims to cover a wall-mounted water discharge pipe 7 and the elbow duct 2, and has an ornamental outer surface 51 to conceal the wall-mounted water discharge pipe 7 and elbow duct 2, and a housing trough 521 on an inner side 52 to hold the elbow duct 2, and two detention flutes 522 corresponding to and wedged in by the jutting ribs 23 of the coupling seat 22.

By means of the aforesaid elements, for assembly and installation, dispose in this order the first coupling ring 31, first washer 32, second washer 33 and second coupling ring 34 of the reverse checking means 3 into the housing chamber 221 of the elbow duct 2; fasten the coupler 4 to the elbow duct 2 to confine the reverse checking means 3 in the housing chamber 221. The external threaded portion 2.1 of the elbow duct 2 is fastened to the wall-mounted water discharge pipe 7. The connector 611 of the hose 61 of the hand-held shower head 6 is fastened to the second threaded portion 42 of the coupler 4 to finish connection of the hand-held shower head 6. When in use and the hand-held shower head 6 is left in a bathtub, the reverse checking means 3 can prevent water from flowing backwards. The operation principle of the reverse checking means 3 is known in the art, details are omitted. The invention provides a smooth coupling on the connecting portion of the wall-mounted water discharge pipe 7. The coupling cap 5 can be coupled with the elbow seat 22 by wedging the jutting ribs 23 in the detention flutes 522 to conceal the wall-mounted water discharge pipe 7 and the elbow duct 2. Thus the disadvantages of the conventional elbow ducts can be overcome.

In short, the invention provides simplified elements and an ornamental cover to conceal the wall-mounted water outlet. It offers an improvement and more practical values than the conventional elbow ducts.

I claim:

1. A wall-mounted elbow duct comprising an elbow duct, a reverse checking means, a coupler and a coupling cap, wherein:

the elbow duct has one end forming an external threaded portion to be fastened to a wall-mounted water discharge pipe and another end forming a coupling seat, the coupling seat having a housing chamber to hold the reverse checking means and two opposing jutting ribs on two outer edges, the housing chamber having an internal screw hole;

the reverse checking means includes a first coupling ring, a first washer, a second washer and a second coupling ring;

the coupler has one end forming a first threaded portion corresponding to the internal screw hole of the elbow duct and another end forming a second threaded portion to be fastened to a hose connector of a hand-held shower head; and the coupling cap for covering the wall-mounted water discharge pipe and the elbow duct, and has an outer surface to conceal the wall-mounted water discharge pipe and the elbow duct and two detention flutes corresponding to and wedged in by the jutting ribs.

2. The wall-mounted elbow duct of claim 1, wherein the coupling cap has a housing trough on an inner side.

* * * * *